United States Patent
Moeller et al.

(10) Patent No.: US 10,594,119 B2
(45) Date of Patent: Mar. 17, 2020

(54) MOUNTING SYSTEM

(71) Applicant: MILWAUKEE ELECTRIC TOOL CORPORATION, Brookfield, WI (US)

(72) Inventors: Scott T. Moeller, Richfield, WI (US); Jason D. Thurner, Menomonee Falls, WI (US); John S. Scott, Brookfield, WI (US); Jonathan Lowry, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/023,770

(22) Filed: Jun. 29, 2018

(65) Prior Publication Data

US 2019/0006828 A1 Jan. 3, 2019

Related U.S. Application Data

(60) Provisional application No. 62/527,373, filed on Jun. 30, 2017.

(51) Int. Cl.
| | |
|---|---|
| *H02G 3/04* | (2006.01) |
| *H02G 3/06* | (2006.01) |
| *F16L 3/06* | (2006.01) |
| *F16B 2/10* | (2006.01) |
| *F16L 3/04* | (2006.01) |
| *F16B 2/18* | (2006.01) |
| *F16B 7/04* | (2006.01) |

(52) U.S. Cl.
CPC ............ *H02G 3/0456* (2013.01); *F16B 2/10* (2013.01); *F16B 2/185* (2013.01); *F16L 3/04* (2013.01); *F16L 3/06* (2013.01); *H02G 3/0616* (2013.01); *F16B 7/046* (2013.01)

(58) Field of Classification Search
CPC ....... H02G 3/0456; H02G 3/0616; F16L 3/04; F16L 3/06; F16B 2/10; F16B 2/185
USPC .................. 248/67, 67.5; 254/34.3 R, 134.5, 254/134.3 PA, 134 FT
See application file for complete search history.

(56) References Cited

U.S. PATENT DOCUMENTS

| | | | | |
|---|---|---|---|---|
| 2,746,715 | A * | 5/1956 | Sherrod | H02G 1/08 254/134.3 R |
| 5,149,056 | A * | 9/1992 | Jones | H02G 1/08 254/134.3 FT |
| 5,271,605 | A * | 12/1993 | Damron | H02G 1/08 254/134.3 FT |
| 6,691,985 | B1 * | 2/2004 | El Haddad | H02G 1/08 254/134.3 FT |
| 7,323,637 | B2 * | 1/2008 | Tideback | H02G 1/08 174/50 |
| 8,579,260 | B2 * | 11/2013 | Raineri | H02G 1/08 254/134.3 R |

(Continued)

*Primary Examiner* — Muhammad Ijaz
(74) *Attorney, Agent, or Firm* — Michael Best & Friedrich LLP (57) ABSTRACT

A mounting system, which secures portions of a wiring system to an electrical box, includes a mounting rack having a frame to which a portion of the wiring system is supported and a clamping member that is movable relative to the frame and engageable with an electrical box such that the mounting rack is configured to be coupled to electrical boxes having varied sizes. The mounting system also includes a conduit connector that is configured to be coupled to a conduit of the electrical box for supporting thereon another portion of the wiring system.

21 Claims, 11 Drawing Sheets

(56) References Cited

U.S. PATENT DOCUMENTS

| | | | | |
|---|---|---|---|---|
| 8,708,313 B1* | 4/2014 | Fredrickson | ........... | B65H 57/02 |
| | | | | 254/134.3 FT |
| 2015/0362093 A1* | 12/2015 | Henderson | ........... | F16M 13/022 |
| | | | | 248/55 |

* cited by examiner

MOUNTING SYSTEM

CROSS-REFERENCE TO RELATED APPLICATIONS

This application claims priority to U.S. Provisional Patent Application No. 62/527,373 filed on Jun. 30, 2017, the entire content of which is incorporated herein by reference.

FIELD OF THE INVENTION

The present invention relates to a mounting system, and more particularly to a mounting system for a wire feeding, fishing, or pulling system.

BACKGROUND OF THE INVENTION

When wiring a building, a wire is pulled through a conduit from one location to another. To do this, a small line is pushed or fished from a first side of the conduit to a second side using a wiring system. Common wiring systems may include, for example, a power fish tape, a tugger or puller, a blower/vacuum, a feeding guide pulley, a power feeder, where each of these components accomplishes a separate function.

The first side of the conduit and the second side of the conduit are generally disposed within an electrical box. As such, each of the devices associated with the wiring system must be coupled to or supported near the electrical box and generally include their own associated features to be coupled to or supported near the electrical box, making them cumbersome to set up and remove. In addition, electrical boxes vary in size, making some coupling and/or support features for the devices difficult or impossible to use with the various sizes of electrical boxes.

SUMMARY OF THE INVENTION

The present invention provides, in one aspect, a mounting system to secure portions of a wiring system to an electrical box. The mounting system includes a mounting rack having a frame to which a portion of the wiring system is supported and a coupling member that is movable relative to the frame and engageable with an electrical box such that the mounting rack is configured to be coupled to electrical boxes having varied sizes. The mounting system also includes a conduit connector that is configured to be coupled to a conduit of the electrical box for supporting thereon another portion of the wiring system.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
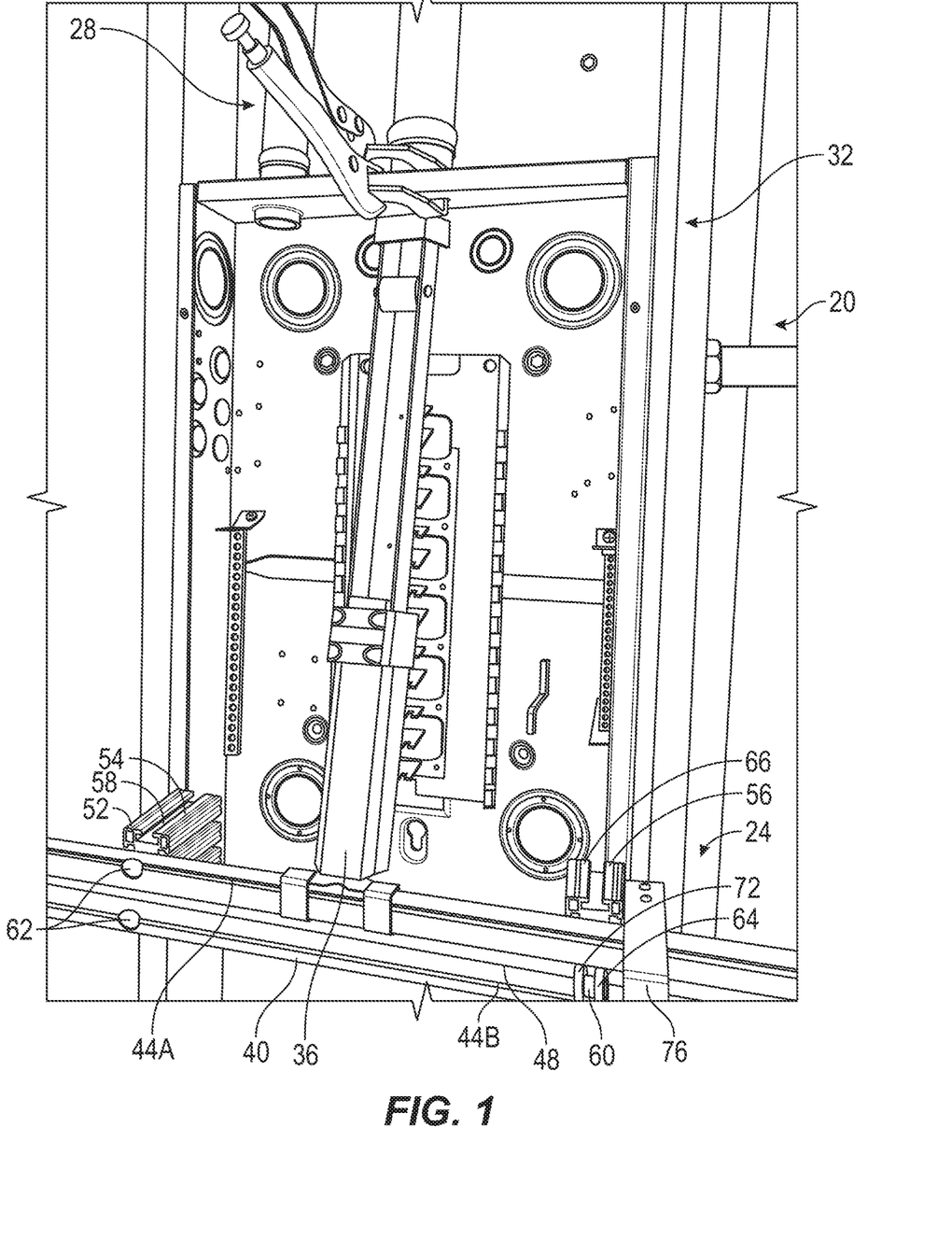
FIG. 1 is a portion of a mounting system in accordance with an embodiment of the invention for supporting at least a portion of a wiring system on an electrical box.

FIG. 1 illustrates a mounting system 20 including a mounting rack 24 and a conduit connector 28. Each of the mounting rack 24 and the conduit connector 28 is connected to an electrical box 32 and support a portion of a wiring system 36 (e.g., a power fish tape, a tugger, a blower/vacuum, a feeding guide pulley, a power feeder, etc.). As will be described in greater detail below, the mounting system 20 is adjustable such that both the mounting rack 24 and the conduit connector 28 may be connected to electrical boxes 32 that vary in size (i.e., height and width).

Figure 2:
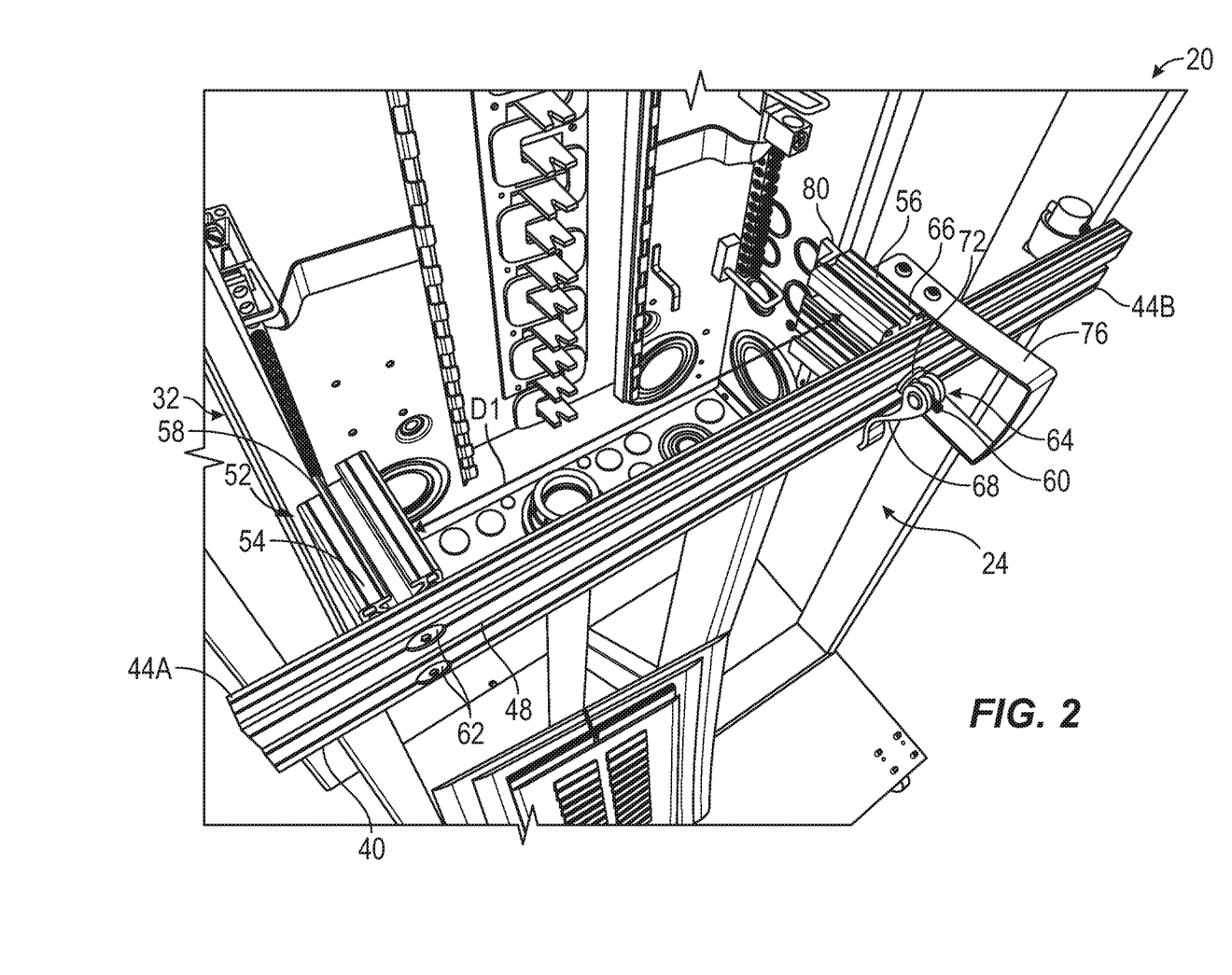
FIG. 2 is a perspective view of a mounting rack of the mounting system of FIG. 1 supported on an electrical box.

With reference to FIGS. 1-4, the mounting rack 24 includes a frame 40 having a pair of rails 44A, 44B with a track 48 defined therebetween. The frame 40 supports a fixed coupling member 52 at a first end and a movable coupling member 56 at a second end. The fixed coupling member 52 includes a spacer 54 positioned between the electrical box 32 and the frame 40. The spacer 54 is connected to both rails 44A, 44B by, for example, a set of fasteners 62. However, the spacer 54 may be connected to the rails 44A, 44B by welding, adhesive, interference fit, or any other suitable means. In addition, the spacer 54 may include a retention feature that engages the track 48 to maintain engagement between the spacer 54 and the frame 40 and provide additional structural support. As seen in FIG. 2, the spacer 54 includes a slot 58 that receives an outer portion of the electrical box 32 (e.g., a flanged portion) so the fixed coupling member 52 can support the mounting rack 24 on the electrical box 32.

Figure 3:
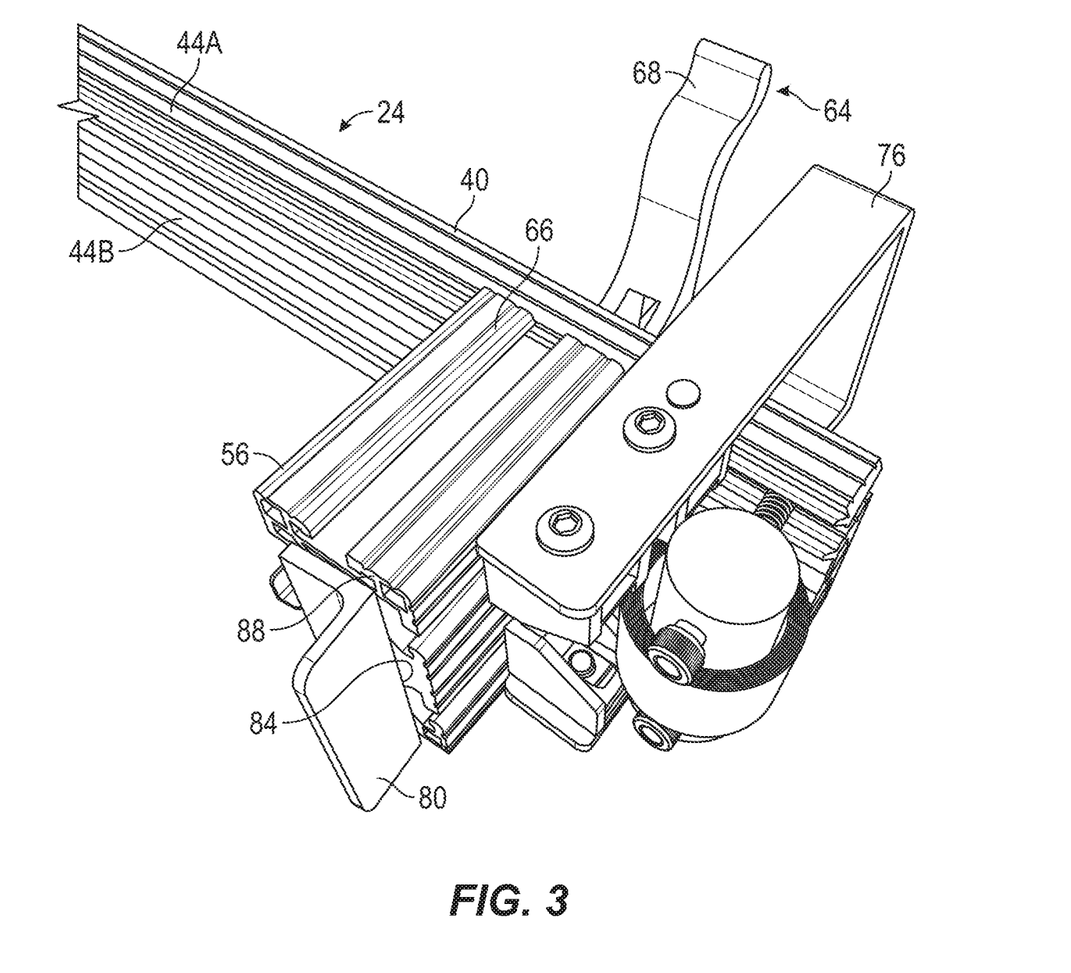
FIG. 3 is a perspective view of an end of the mounting rack.
Figure 4:
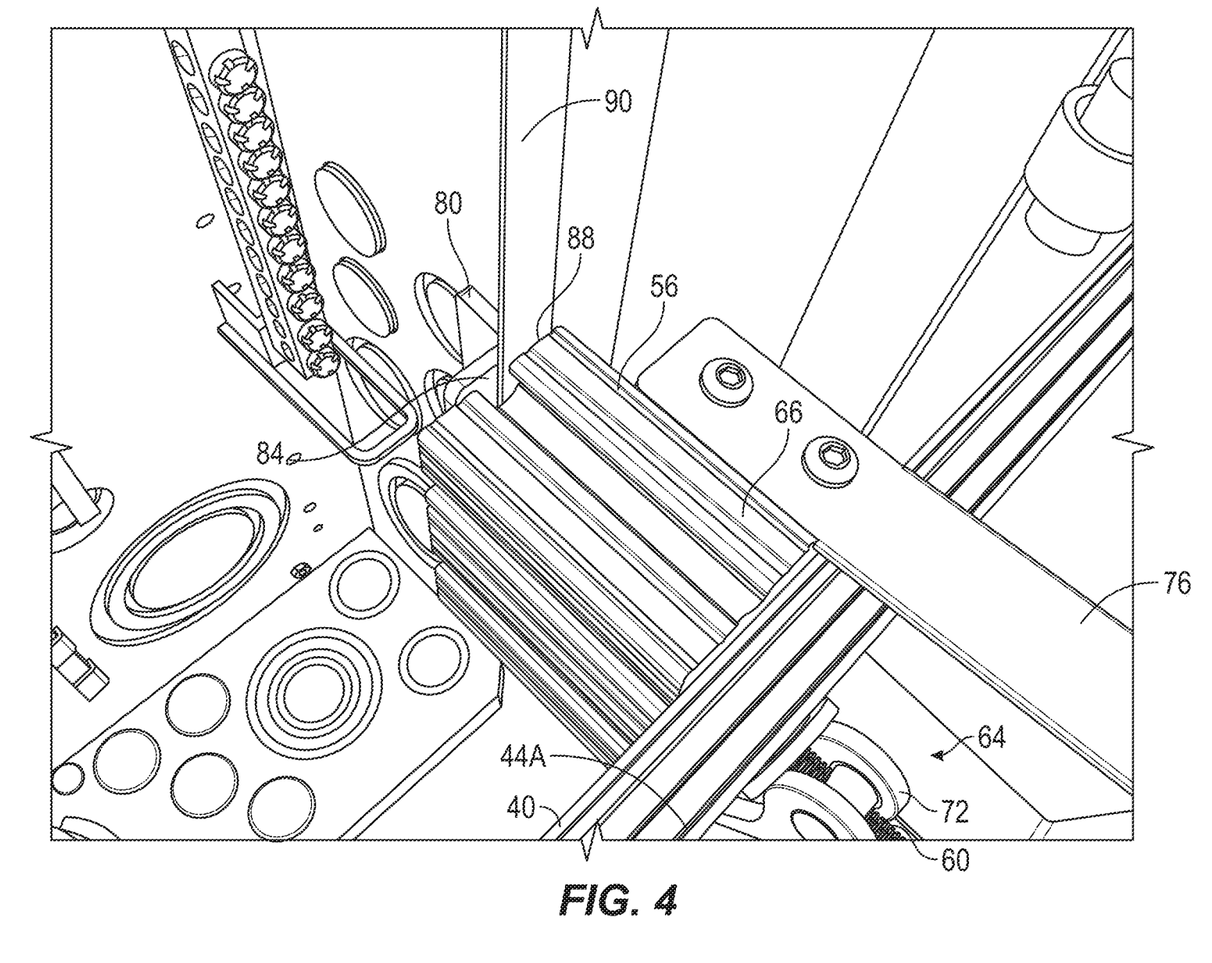
FIG. 4 is a perspective view of the end of the mounting rack shown in FIG. 3 coupled to the electrical box.

With reference to FIGS. 2-4, the movable coupling member 56 includes a spacer 66 positioned between the electrical box 32 and the frame 40, and a pin 60 extending into and through the track 48 to support the movable coupling member 56 on the frame 40. A first end of the pin 60 is anchored to the spacer 66 and a locking mechanism 64 (e.g., an over center latch) is coupled to a second end of the pin 60 and disposed on a side of the frame 40 opposite the spacer 66. In the illustrated embodiment, the locking mechanism 64 includes a pivotal handle 68 that bears on a locking washer 72 (e.g., via a camming action during pivotal movement of the handle 68). The locking mechanism 64 is movable between a disengaged or release position (FIG. 3), in which locking washer 72 does not frictionally engage the rails 44A, 44B (e.g., the locking washer 72 is spaced from the rails 44A, 44B), thus releasing a clamping force between the spacer 66 and the rails 44A, 44B, and an engaged position (FIG. 2), in which the locking washer 72 is displaced by the pivotal handle 68 to engage the rails 44A, 44B such that the rails 44A, 44B are clamped between the spacer 66 and the locking washer 72. In the disengaged position of the locking mechanism 64, the movable coupling member 56 is displaceable along the track 48 (i.e., the pin 60 slides along the track 48) such that a distance D1 between the fixed coupling member 52 and the movable coupling member 56 may be varied to accommodate different size (i.e., width) electrical boxes 32. In the engaged position of the locking mechanism 64, the movable coupling member 56 is fixed into place relative to the fixed coupling member 52. As shown in FIG. 3, the movable coupling member 56 further includes a handle 76 that may, for example, be grasped by the user to move the movable coupling member 56 along the track 48.

With reference to FIG. 4, the movable coupling member 56 includes an L-shaped bracket 80 disposed on an end of the spacer 66 opposite the rails 44A, 44B. The L-shaped bracket 80 includes an engagement surface 84 in facing relation with an engagement surface 88 defined on an end of the spacer 66. The L-shaped bracket 80 is movable between a locked position and an unlocked position in a direction that is generally perpendicular to an axis defined by the track 48. In the locked position, the distance between the engagement surfaces 84, 88 is decreased such that a portion of the electrical box 32 (e.g., flange 90) may be clamped between the engagement surfaces 84, 88 to support the movable coupling member 56, and thereby the mounting rack 24, on the electrical box 32. In the unlocked position, the distance between the engagement surfaces 84, 88 is increased such that the movable coupling member 56, and thereby the mounting rack 24, may be released from the electrical box 32.

In an alternate embodiment, the mounting rack 24 includes a second movable coupling member in place of the fixed coupling member 52 described above. The second movable coupling member is substantially similar to the movable coupling member 56 described above. This embodiment enables each movable coupling member to be moved along the track 48 to adjust a distance between the movable coupling member 56 and the second movable coupling member by moving one or both of the movable coupling member 56 and the second movable coupling member.

In another alternate embodiment, the mounting rack 24 includes a second movable coupling member in place of the fixed coupling member 52 described above. The second movable coupling member may be substantially similar to the movable coupling member 56 described above except the second movable coupling member includes a spacer similar to spacer 54 in place of spacer 66. More specifically, the spacer of the second movable coupling member includes a slot 58 to engage the electrical box 32.

Figure 5:
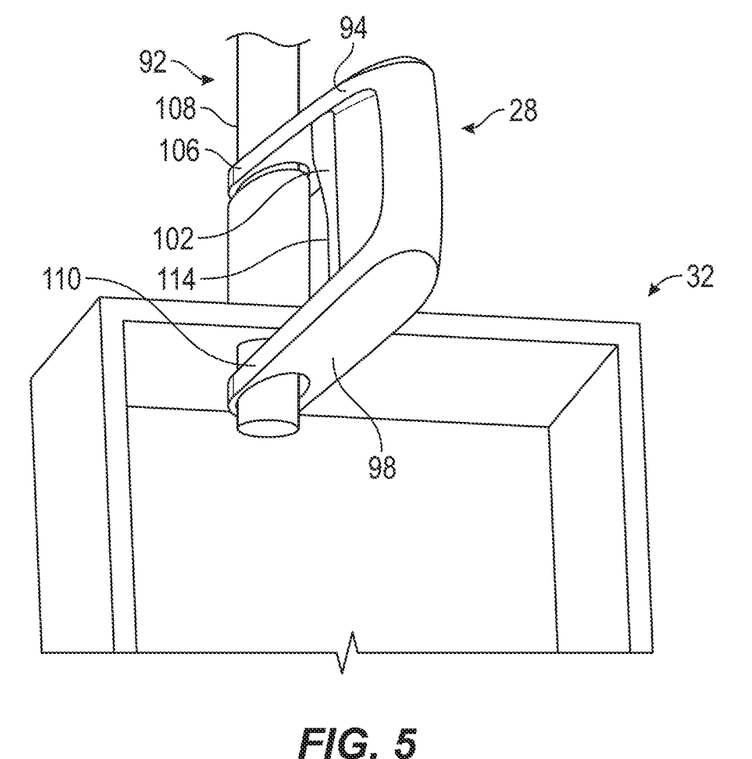
FIG. 5 is a perspective view of a conduit connector of the mounting system.

With reference to FIG. 5, the conduit connector 28 includes a clamping mechanism 92 defined by a pair of clamping projections 94, 98 that are operated by an actuator 102. A first clamping projection 94 includes a U-shaped engagement end 106 that receives a portion of a conduit 108 that extends away from the electrical box 32 on an exterior of the electrical box 32. A second clamping projection 98 includes a U-shaped connector 110 that receives a portion of the conduit 108 that protrudes into an interior of the electrical box 32. The U-shaped connector 110 also engages an upper portion of the wiring system 36 to support the upper portion and maintain proper alignment between the upper portion and the conduit 108. In the embodiment illustrated in FIG. 5, the actuator 102 is a trigger that effects linear displacement of one or both of the pair of clamping projections 94, 98 toward one another in order to effect clamping of the electrical box 32 between the clamping projections 94, 98. In this embodiment, the conduit connector 28 also includes a release 114 (e.g., a release trigger) that enables free movement of the clamping projections 94, 98 to release the conduit connector 28 from the electrical box 32.

Figure 6:
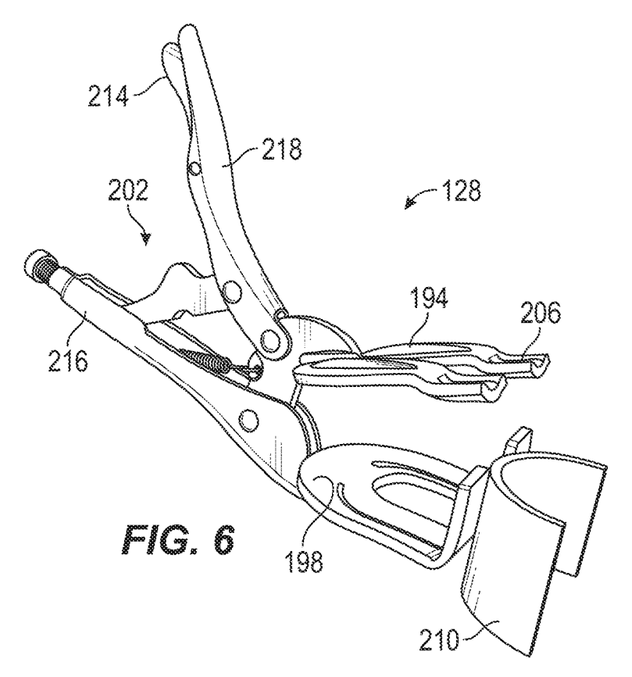
FIG. 6 is a perspective view of a second embodiment of a conduit connector of the mounting system.
Figure 7:
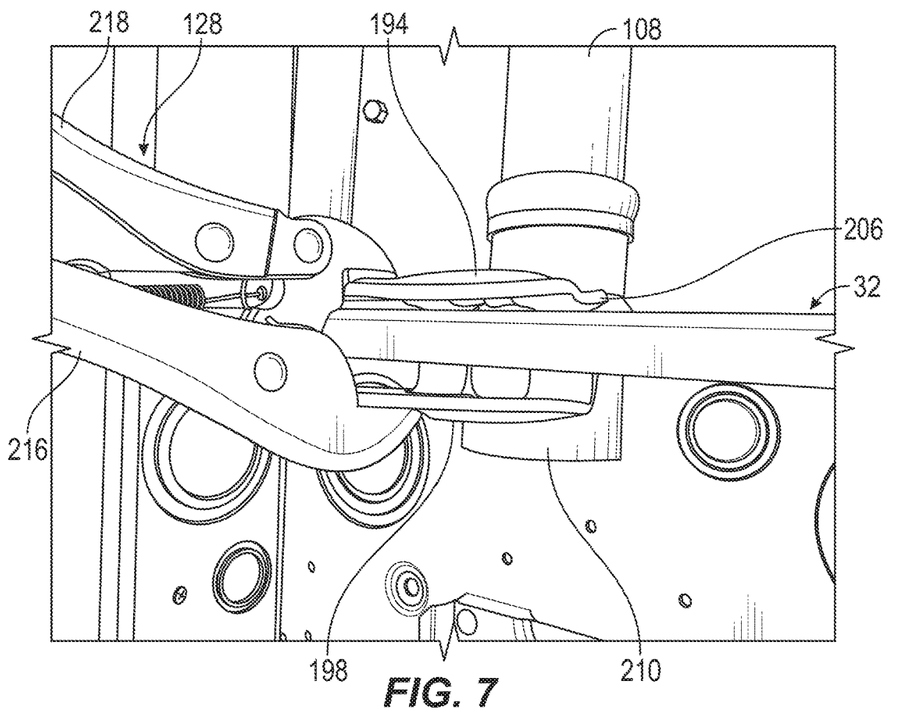
FIG. 7 is a perspective view of the conduit connector of FIG. 6 coupled to a conduit and the electrical box.
Figure 8:
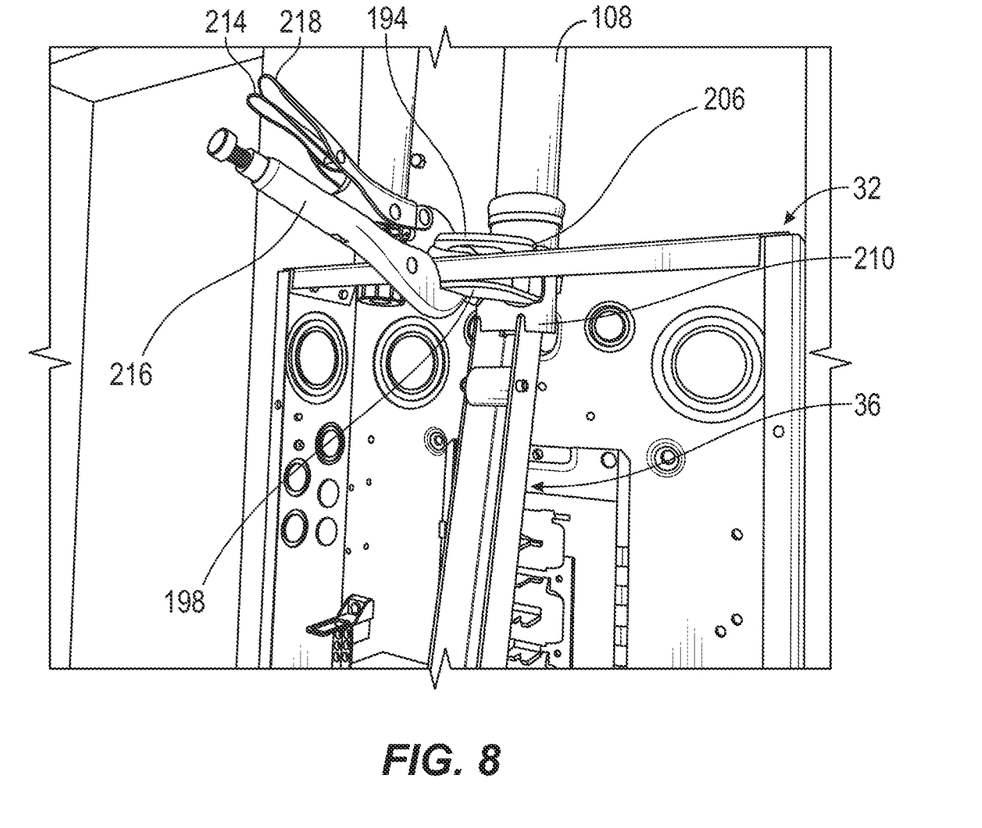
FIG. 8 is a perspective view of an upper portion of the wiring system coupled to the conduit connector of FIG. 6.

With reference to FIGS. 6-8, an alternate embodiment of the conduit connector 128 is illustrated. The conduit connector 128 of this embodiment similarly includes a clamping mechanism 192 defined by a pair of clamping projections 194, 198 that are operated by an actuator 202. A first clamping projection 194 includes a U-shaped engagement end 206 that receives a portion of the conduit 108 that extends away from the electrical box 32 on an exterior of the electrical box 32. A second clamping mechanism 198 includes a U-shaped connector 210 that receives a portion of the conduit 108 that protrudes into an interior of the electrical box 32. The U-shaped connector 210 also engages an upper portion of the wiring system 36 to support the upper portion and maintain proper alignment between the upper portion and the conduit 108 (FIG. 8). In the embodiment illustrated in FIGS. 6-8, the actuator 202 includes a fixed handle 216 and a pivoting handle 218. Actuation of the pivoting handle 218 effects linear displacement of one or both of the pair of clamping projections 194, 198 toward one another in order to effect clamping of the electrical box 32 between the clamping projections 194, 198. In this embodiment, the conduit connector 128 also includes a release 214 (e.g., a push button) disposed on the fixed handle 216 that enables free displacement of the clamping projections 194, 198 to release the conduit connector 128 from the electrical box 32.

FIGS. 9-14 illustrate the mounting system 20 connected to the electrical box 32 and supporting various components of a wiring system 36. The mounting rack 24 is connected to the electrical box 32 and supports a first portion of the components of the wiring system 36, and the conduit connector 28 is connected to the conduit 108 and clamped to the electrical box 32 while supporting an upper portion of the various components of the wiring system 36.

Figure 9:
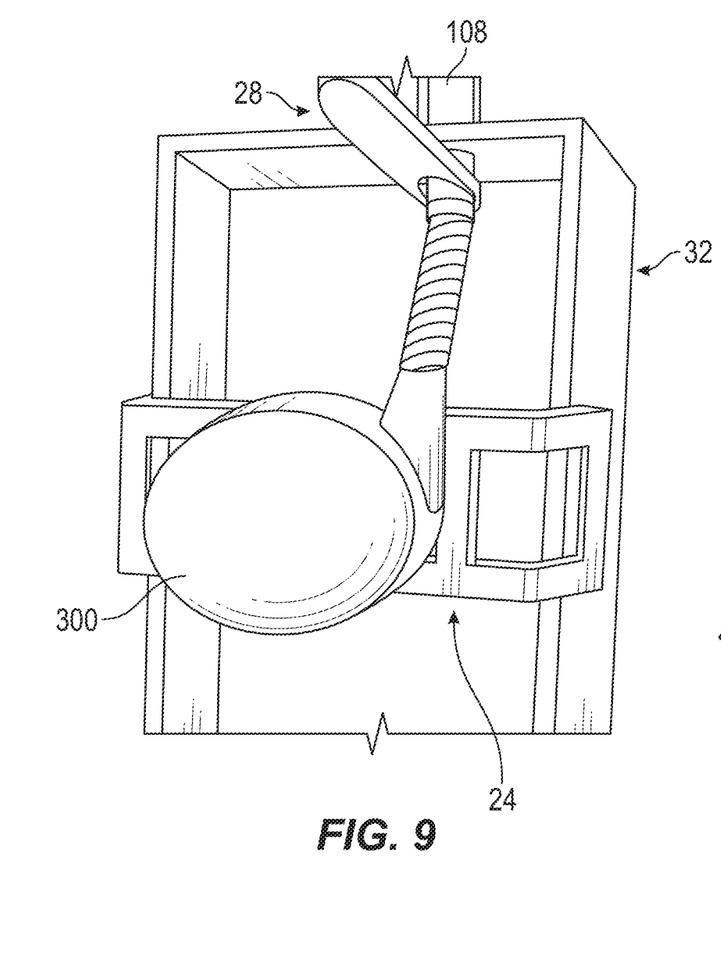
FIG. 9 is a perspective view of a power fish tape coupled to the mounting system.
Figure 10:
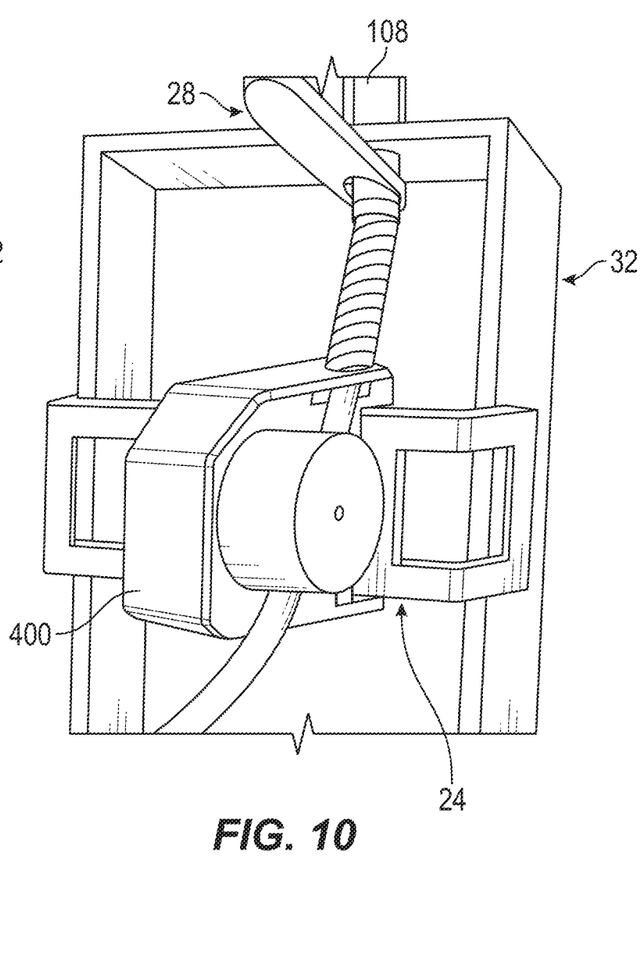
FIG. 10 is a perspective view of a first tugger coupled to the mounting system.
Figure 11:
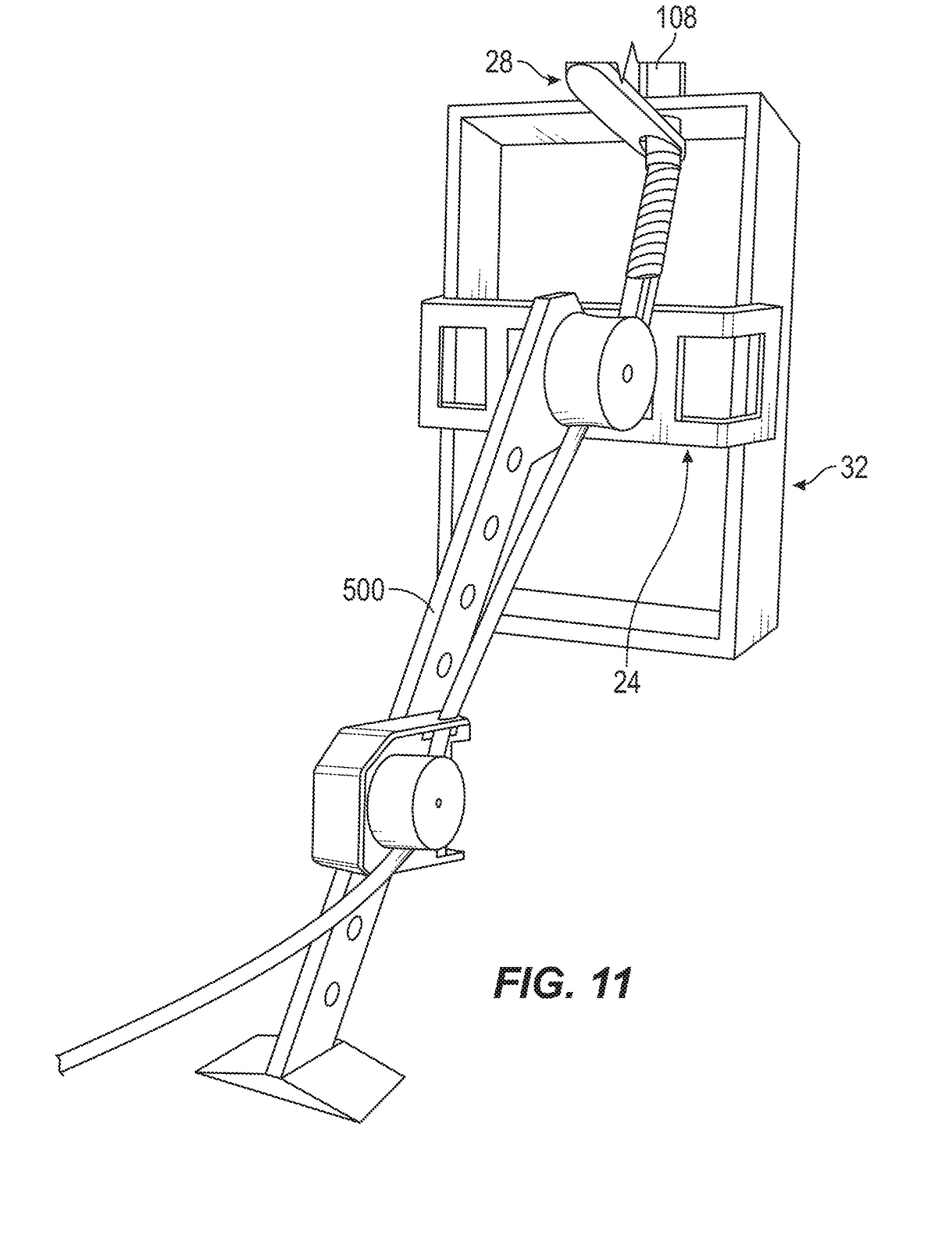
FIG. 11 is a perspective view of a second tugger coupled to the mounting system.
Figure 12:
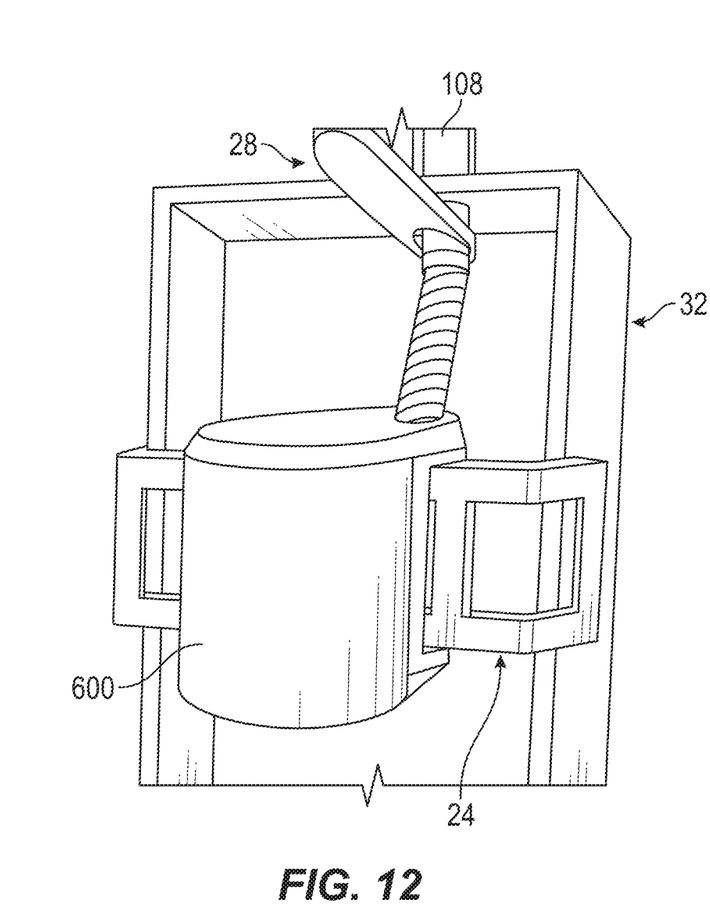
FIG. 12 is a perspective view of a blower/vacuum coupled to the mounting system.
Figure 13:
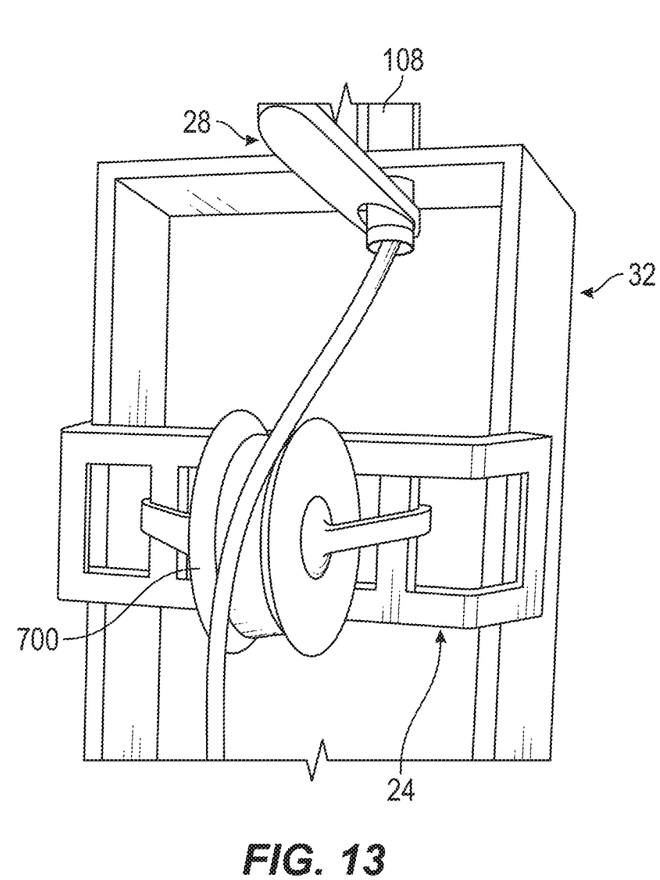
FIG. 13 is a perspective view of a feeding guide pulley coupled to the mounting system.
Figure 14:
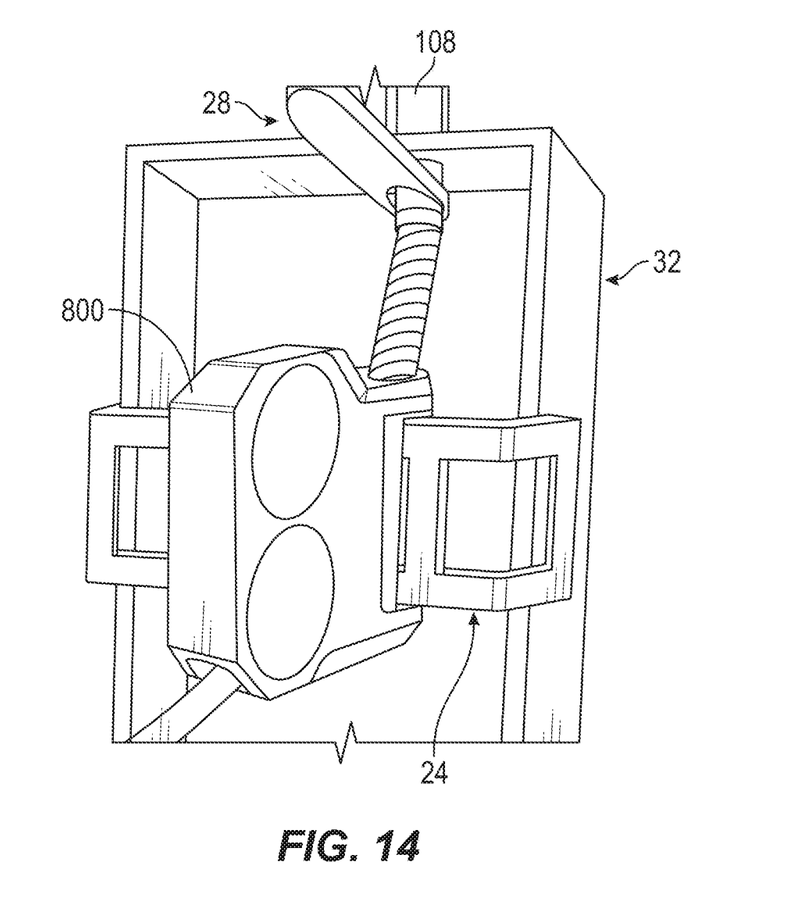
FIG. 14 is a perspective view of a power feeder coupled to the mounting system.

In the example shown in FIG. 9, the component of the wiring system 36 that is supported on the mounting system 20 is a power fish tape 300. In the example shown in FIG. 10, the component of the wiring system 36 that is supported on the mounting system 20 is a first tugger 400. In the example shown in FIG. 11, the component of the wiring system 36 that is supported on the mounting system 20 is a second tugger 500 that is larger and more powerful that the first tugger 400. In the example shown in FIG. 12, the component of the wiring system 36 that is supported on the mounting system 20 is a blower/vacuum 600. In the example shown in FIG. 13, the component of the wiring system 36 that is supported on the mounting system 20 is a feeding guide pulley 700. In the example shown in FIG. 14, the component of the wiring system 36 that is supported on the mounting system 20 is a power feeder 800.

The mounting system 20 described above is an adjustable system that allows each of the mounting rack 24 and the conduit connector 28 to be mounted on electrical boxes that vary in size and shape. Advantageously, the mounting rack 24 can be connected to any electrical box 32 at any point along the vertical extent of the electrical box 32 to accommodate components of an electrical system that vary in size and shape, in addition to being adjustable to accommodate electrical boxes 32 of varying widths. Similarly, the conduit connector 28, 128 can be connected to any electrical box 32.

Various features of the invention are set forth in the following claims.

What is claimed is:

1. A mounting system to secure portions of a wiring system to an electrical box, the mounting system comprising:
    a mounting rack including
        a frame on which a portion of the wiring system is configured to be supported, and
        a coupling member that is movable relative to the frame and engageable with the electrical box, permitting the mounting rack to be coupled to electrical boxes having varied sizes; and
    a conduit connector that is configured to be coupled to a conduit of the electrical box for supporting thereon another portion of the wiring system, wherein the conduit connector includes a clamping mechanism having a first clamping projection and a second clamping projection, and an actuator configured to actuate the clamping mechanism.

2. The mounting system of claim 1, wherein the coupling member is a first coupling member disposed proximate a first end of the frame, wherein the mounting system further comprises a second coupling member disposed proximate a second end of the frame, and wherein the first and second coupling members space the frame from the electrical box.

3. The mounting system of claim 2, wherein the second coupling member is one of fixed to the frame or movable relative to the frame.

4. The mounting system of claim 3, wherein the second coupling member is fixed to the frame and includes a spacer configured to be positioned between the electrical box and the frame.

5. The mounting system of claim 3, wherein the first coupling member includes
    a spacer configured to be positioned between the electrical box and the frame; and
    a pin extending through the frame to support the first coupling member on the frame.

6. The mounting system of claim 5, further including a locking mechanism coupled to the pin to selectively apply a clamping force between the spacer and the frame.

7. The mounting system of claim 6, wherein the locking mechanism includes a pivotal handle movable between a first position in which the clamping force between the spacer and the frame is applied, and a second position in which the clamping force is released, thereby permitting the first coupling member to be moved along the frame.

8. The mounting system of claim 7, wherein the second coupling member is fixed to the frame.

9. The mounting system of claim 3, wherein the first coupling member is configured to move such that a distance between the first coupling member and the second coupling member varies.

10. The mounting system of claim 1, wherein the coupling member includes a handle configured to be grasped by a user to move the coupling member along the frame.

11. The mounting system of claim 1, wherein the coupling member comprises
    a spacer configured to be positioned between the electrical box and the frame, and
    an L-shaped bracket having a first engagement surface in facing relationship with a second engagement surface on an end of the spacer.

12. The mounting system of claim 11, wherein the L-shaped bracket is movable between a locked position where the electrical box is configured to be clamped between the first engagement surface and the second engagement surface, and an unlocked position where the coupling member and the mounting rack are configured to be released from the electrical box.

13. The mounting system of claim 1, wherein the frame includes a first rail, a second rail, and a track defined between the first rail and the second rail.

14. The mounting system of claim 13, wherein the spacer includes a slot configured to receive a flanged portion of the electrical box.

15. The mounting system of claim 13, wherein the coupling member comprises a spacer connected to the first rail and the second rail, and wherein the spacer is configured to be positioned between the electrical box and the frame.

16. The mounting system of claim 1, wherein the first clamping projection includes an engagement end configured to receive a portion of the conduit that extends away from the electrical box on an exterior of the electrical box.

17. The mounting system of claim 1, wherein the second clamping projection includes a connector configured to receive a portion of the conduit extending into an interior of the electrical box.

18. The mounting system of claim 1, wherein the actuator is a trigger configured to release the first clamping projection and the second clamping projection, and thereby configured to release the conduit connector from the electrical box.

19. The mounting system of claim 1, wherein the wiring system is one of a power fish tape, a tugger, a blower, a vacuum, a guide pulley, or a power feeder.

20. A mounting system to secure portions of a wiring system to an electrical box, the mounting system comprising:
    a mounting rack including
        a frame on which a portion of the wiring system is configured to be supported,
        a first coupling member that is movable relative to the frame and engageable with the electrical box, permitting the mounting rack to be coupled to electrical boxes having varied sizes, the first coupling member disposed proximate a first end of the frame, and
        a second coupling member disposed proximate a second end of the frame, the first and second coupling members spacing the frame from the electrical box; and
    a conduit connector that is configured to be coupled to a conduit of the electrical box for supporting thereon another portion of the wiring system,
    wherein the second coupling member is one of fixed to the frame or movable relative to the frame,
    wherein the first coupling member includes
        a spacer configured to be positioned between the electrical box and the frame; and
        a pin extending through the frame to support the first coupling member on the frame,
    wherein the mounting system further comprises a locking mechanism coupled to the pin to selectively apply a clamping force between the spacer and the frame, and wherein the locking mechanism includes a pivotal handle movable between a first position in which the clamping force between the spacer and the frame is applied, and a second position in which the clamping force is released, thereby permitting the first coupling member to be moved along the frame.

21. A mounting system to secure portions of a wiring system to an electrical box, the mounting system comprising:
   a mounting rack including
      a frame on which a portion of the wiring system is configured to be supported, and
      a coupling member that is movable relative to the frame and engageable with the electrical box, permitting the mounting rack to be coupled to electrical boxes having varied sizes, the coupling member comprising
         a spacer configured to be positioned between the electrical box and the frame, and
         an L-shaped bracket having a first engagement surface in facing relationship with a second engagement surface on an end of the spacer; and
   a conduit connector that is configured to be coupled to a conduit of the electrical box for supporting thereon another portion of the wiring system,
   wherein the L-shaped bracket is movable between a locked position where the electrical box is configured to be clamped between the first engagement surface and the second engagement surface, and an unlocked position where the coupling member and the mounting rack are configured to be released from the electrical box.

* * * * *